US008026636B2

(12) United States Patent
Oh

(10) Patent No.: US 8,026,636 B2
(45) Date of Patent: Sep. 27, 2011

(54) APPARATUS AND METHOD FOR SUPPLYING POWER TO ELECTRONIC DEVICE

(75) Inventor: Jang Geun Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 12/466,612

(22) Filed: May 15, 2009

(65) Prior Publication Data

US 2010/0219687 A1 Sep. 2, 2010

(30) Foreign Application Priority Data

Mar. 2, 2009 (KR) ........................ 10-2009-0017501

(51) Int. Cl.
*H02J 3/14* (2006.01)

(52) U.S. Cl. ........................................................ 307/31

(58) Field of Classification Search .................. 320/127, 320/135; 307/130, 82, 112, 116, 125, 139, 307/140, 150, 151, 31; 713/300
See application file for complete search history.

(56) References Cited

U.S. PATENT DOCUMENTS 6,801,027 B2 * 10/2004 Hann et al. .................... 323/282
7,547,994 B2 * 6/2009 Cheon ........................... 307/130
2010/0060078 A1 * 3/2010 Shaw .............................. 307/31

FOREIGN PATENT DOCUMENTS

KR 2004033736 A * 4/2004

* cited by examiner

*Primary Examiner* — Jared Fureman
*Assistant Examiner* — Daniel Cavallari
(74) *Attorney, Agent, or Firm* — Birch, Stewart, Kolasch & Birch, LLP

(57) ABSTRACT

An apparatus and method allows selection of either one of main power supplied from a battery and DC Output (DCO) power supplied from a DC/DC converter included in a power management integrated circuit (PMIC) as the input power of an LDO regulator and supply of the selected power to the LDO regulator. The voltage of the input power of the LDO regulator is as low as possible, thus to reduce power loss caused by the LDO regulator. Also, DCO power supplied from the DC/DC converter included in the PMIC is supplied to the LDO regulator as the input power, and if a load connected to the DC/DC converter is turned off, the DC/DC converter is variably controlled to reduce the voltage of the input power supplied to the LDO regulator to be as low as possible, to thus reduce power loss caused by the LDO regulator.

17 Claims, 11 Drawing Sheets

DCO/LDO Control Data Base

| A-Processor Unit | Control | B-Processor Unit | Control |
|---|---|---|---|
| EMP | 0000 | nVidia | 0000 |
| Qualcomm | 0001 | OMAP | 0001 |
| Infineon | 0010 | Marvell | 0010 |
| --- | --- | --- | --- |

APPARATUS AND METHOD FOR SUPPLYING POWER TO ELECTRONIC DEVICE

This application claims the benefit of Korean Patent Application No. 10-2009-0017501, filed on Mar. 2, 2009, which is incorporated herein by reference for all purposes as if fully set forth herein.

BACKGROUND

1. Field

This document relates to an apparatus and method of supplying power to an electronic device.

2. Related Art

Generally, power supplies for electronic devices such as mobile phones, personal digital assistants (PDAs), and laptop computers include a power management integrated circuit (PMIC) 10 as shown in FIG. 1.

The PMIC 10 includes a controller 100, a plurality of DC/DC converters $\mathbf{110}_1$, $\mathbf{110}_2$, and $\mathbf{110}_3$, and a plurality of low-dropout (LDO) regulators $\mathbf{120}_1$, $\mathbf{120}_2$, and $\mathbf{120}_3$.

The controller 100 enables the plurality of DC/DC converters and LDO regulators to have a predetermined initial (power) value when the electronic device is system-booted.

Accordingly, main power supplied to the PMIC 10 is converted to different output power components. For example, main power of 3.7V/1500 mA supplied from a battery is converted to DCO1 (DC output1) power of 2.5V/450 mA by the first DC/DC converter $\mathbf{110}_1$.

The main power is also converted to DCO2 power of 3.3V/1000 mA by the second DC/DC converter $\mathbf{110}_2$, and to DCO3 power of 1.3V/500 mA by the third DC/DC converter $\mathbf{110}_3$.

The main power of 3.7V/1500 mA is converted to LDO1 power of 1.8V/100 mA by the first LDO regulator $\mathbf{120}_1$, LDO2 power of 1.5V/200 mA by the second LDO regulator $\mathbf{120}_2$, and LDO3 power of 1.2V/150 mA by the third LDO regulator $\mathbf{120}_3$.

Each converted output power is supplied to each different load as operating power. The DC/DC converter is a voltage converting device for making an output voltage higher or lower than an input voltage. A converter for converting a low input voltage to a higher output voltage is called "step-up converter" and a converter for converting a high input voltage to a lower output voltage is called "step-down converter".

For example, a step-up converter employs a buck DC/DC converter and a step-down converter employs a boost converter. In general, DC/DC converters are classified into PWM (Pulse Width Modulation) type DC/DC converters and PFM (Pulse Frequency Modulation) type DC/DC converters based on switching scheme.

Meanwhile, LDO regulators have the advantage of being capable of supplying a stable voltage having reduced ripple components, as is widely known. In the case of a high input voltage, however, significant power loss may occur while the high input voltage is converted to a lower output voltage.

SUMMARY

An aspect of this document provides an apparatus and method of supplying power to an electronic device, which may reduce power loss caused by LDO regulators in a power management integrated circuit (PMIC).

In an aspect, an apparatus for supplying power to an electronic device includes a plurality of DC/DC converters configure to respectively output power; a plurality of low-dropout (LDO) regulators configured to respectively output converted power to power-consuming loads; one or more switching elements that select any one of a plurality of different powers including the output power of the DC/DC converters and input the selected power to the plurality of LDO regulators; and a controller that controls operation of the one or more switching elements based on the converted power and the power-consuming loads.

In another aspect, an apparatus for supplying power to an electronic device includes a plurality of DC/DC converters configured to output power; a plurality of LDO regulators configured to output converted power; and a controller configured to control supply of the output power of the at least one of the plurality of DC/DC converters to the at least one of the plurality of LDO regulators as input power, and to variably control the at least one of the plurality of DC/DC converters to variably adjust the input power of the at least one of the plurality of LDO regulators.

In still another aspect, a method for supplying power to an electronic device includes selecting either one of main power supplied from a battery and DC Out (DCO) power supplied from a DC/DC converter to supply the selected power to at least one LDO regulator as input power; and changing the selected power supplied to the at least one LDO regulator to the other based on a state of a power-consuming load that is connected at an output end of the at least one LDO regulator.

In yet another aspect, a method for supplying power to an electronic device includes supplying output power of a DC/DC converter to an LDO regulator as input power; and variably controlling the DC/DC converter based on a state of a load connected at an output end of the DC/DC converter and a state of a load connected at an output end of the LDO regulator to change the input power of the LDO regulator.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
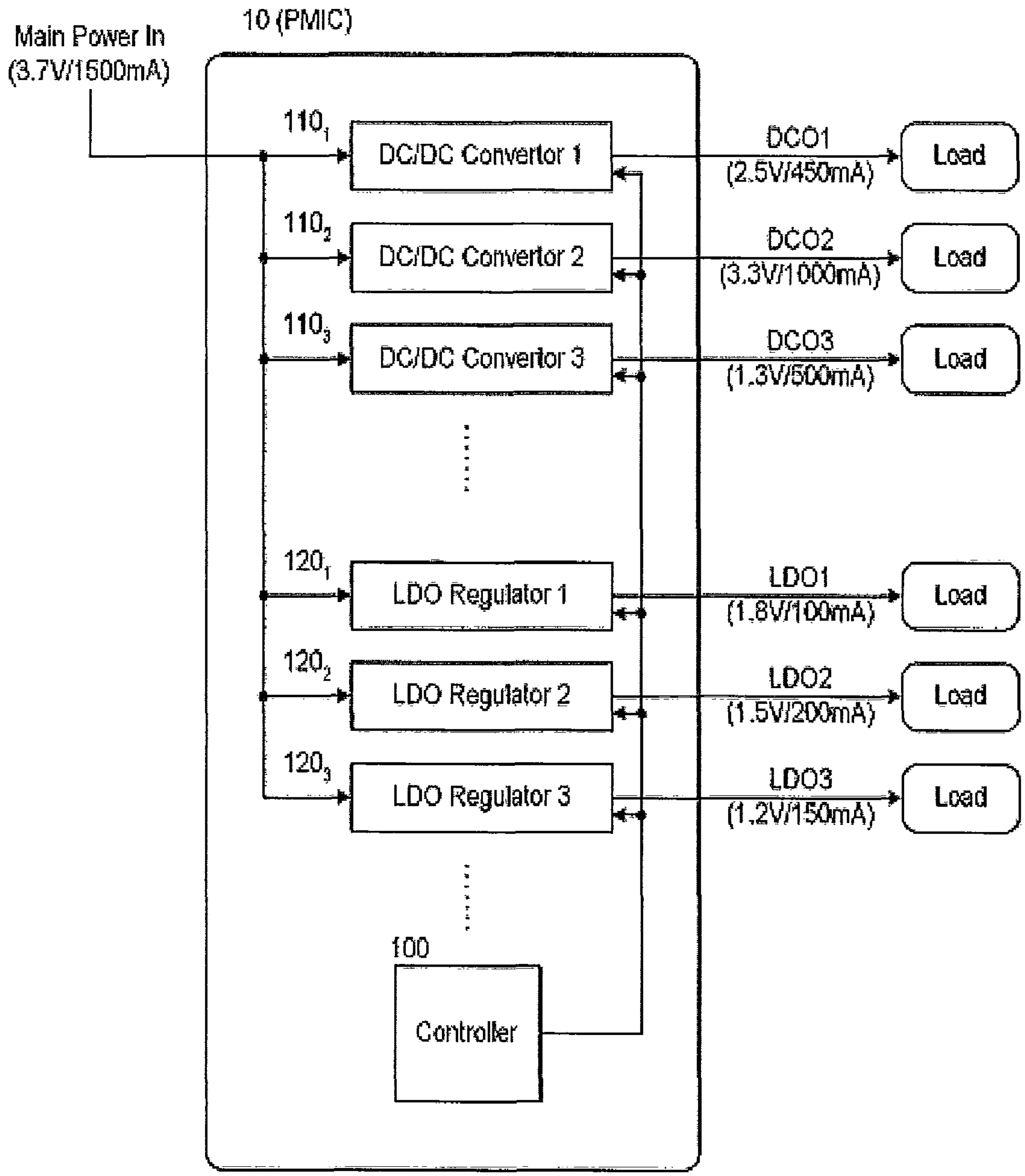
FIG. 1 is a view illustrating a construction of a conventional power supply.

The above and other objects, features, and advantages of this document will become more apparent from the following detailed description of exemplary embodiments with reference to the accompanying drawings. Throughout the drawings, the same reference numerals are used to denote like structures. Well-known structures or functions will not be described in detail if deemed that such description would detract from the clarity and concision of this document.

This document relates to a power supply for electronic devices such as mobile phones, PDAs, and laptop computers. The power supply employs a power management integrated circuit (PMIC) that includes a plurality of DC/DC converters, a plurality of LDO regulators, and a controller.

The PMIC includes a switching element for selecting any one of a plurality of different powers sources and supplies as low an input voltage as possible to the LDO regulator.

Figure 2:
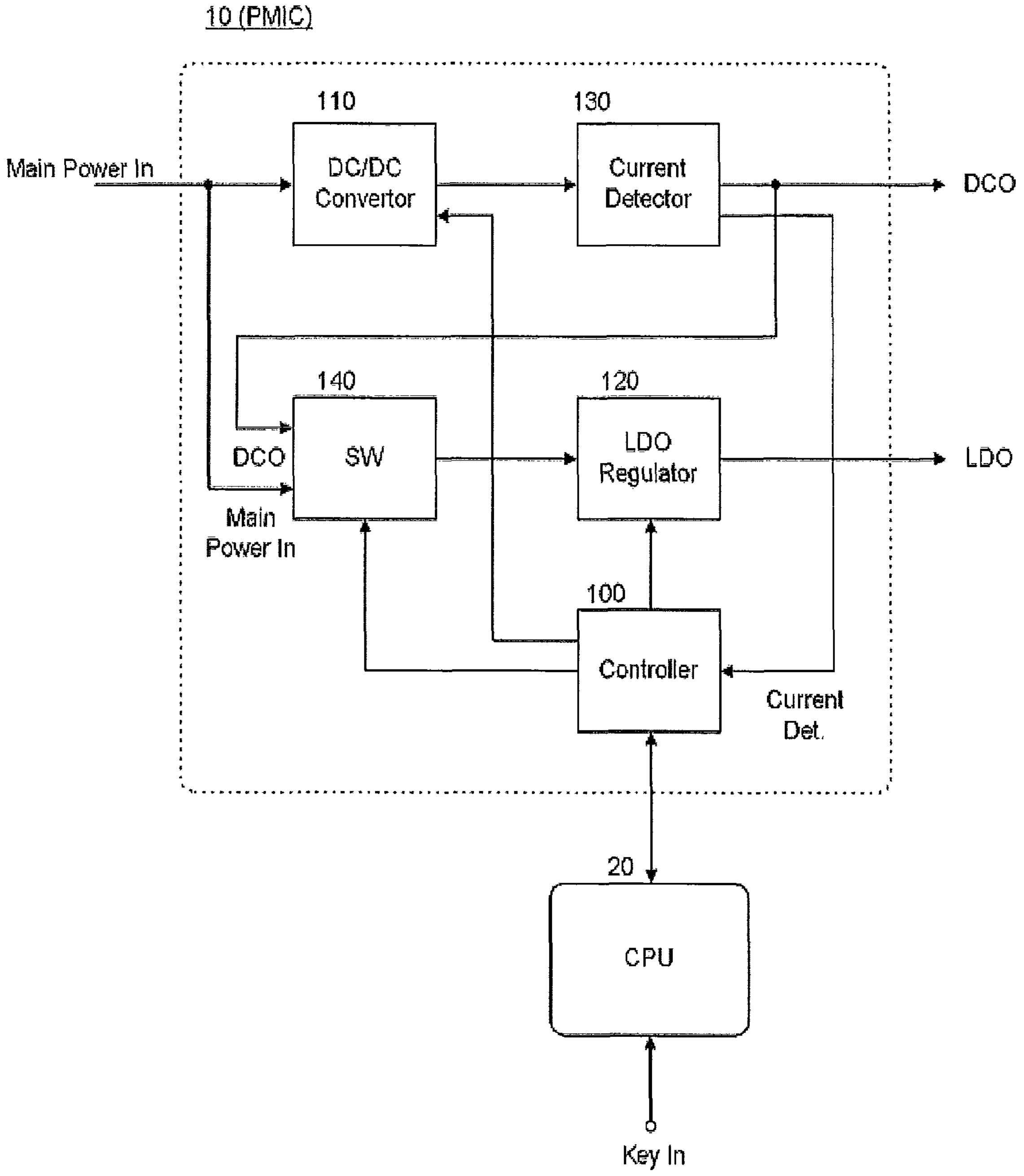
FIG. 2 is a view schematically illustrating a construction of a power supply according to an embodiment.

For example, a switching element 140 may be supplied with main power from a battery and DCO power converted by a DC/DC converter 110, as shown in FIG. 2.

A controller 100 controls a switching element 140 to selectively supply the main power or the DCO power to an LDO regulator 120.

Meanwhile, a current detector 130 may be provided at the rear end of the DC/DC converter 110, as shown in FIG. 2. In this case, the controller 100 controls the switching element 140 so that a current value detected by the current detector 130 does not exceed a predetermined reference current value.

For example, as the number of loads, which are provided at the rear end of the DC/DC converter 110 and the LDO regulator 120 and consume power, increases, the current value detected by the current detector 130 increases correspondingly. Thus, the controller 100 controls the switching element 140 to selectively supply the LDO regulator 120 with the main power having relatively high voltage and current values.

On the contrary, as the number of loads, which are provided at the rear end of the DC/DC converter 110 and the LDO regulator 120 and consume power, decreases, the current value detected by the current detector 130 also decreases. Thus, the controller 100 controls the switching element 140 to selectively supply the LDO regulator 120 with the DCO power having relatively low voltage and current values.

Accordingly, the input voltage of the power supplied to the LDO regulator 120 may become as low as possible, and this may reduce power loss caused by the LDO regulator 120.

Meanwhile, if the current detector 130 is not provided, the controller 100 predicts whether the number of loads connected at the rear end of the DC/DC converter 110 and the LDO regulator 120 increases or decreases by interfacing with a CPU 20 that executes various application programs in response to a user's key entries (Key In).

When the number of loads is predicted to increase, the controller 100 selects the main power and supplies it to the LDO regulator 120, and when the number of loads is predicted to decrease, the controller 100 selects the DCO power and supplies it to the LDO regulator 120.

Accordingly, the input voltage supplied to the LDO regulator 120 may be as low as possible, and thus, power loss caused by the LDO regulator 120 may be reduced.

Meanwhile, the controller 100 determines whether the source of supplying the main power is a battery, or an external power source that supplies unlimited power, and if the source is an external power source, the controller 100 allows the external power source to continue to supply power to the LDO regulator 120.

Figure 3:
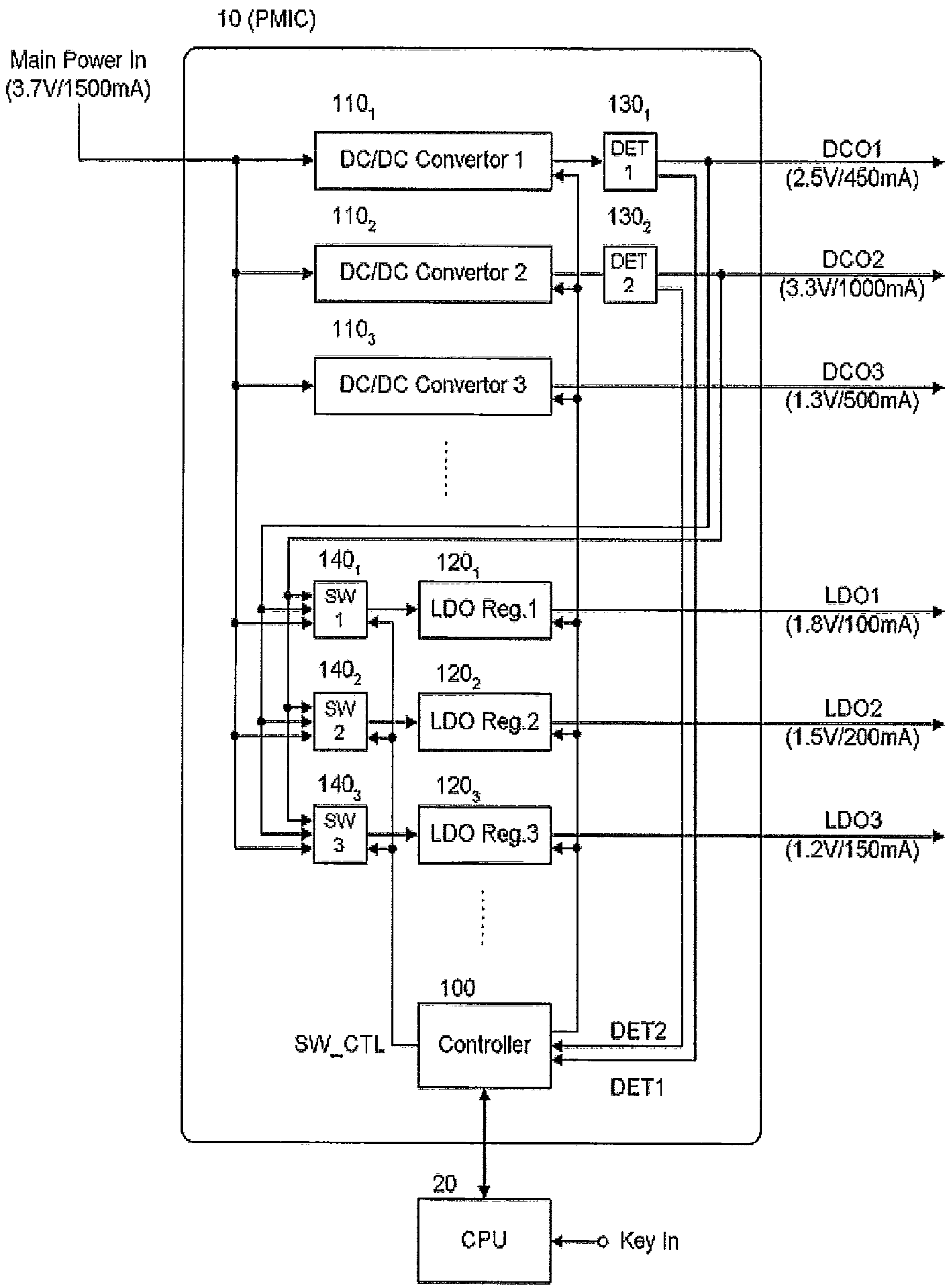
FIGS. 3 to 8 are views illustrating power supplies according to embodiments in more detail.

FIG. 3 is a view illustrating a power supply for an electronic device according to an embodiment in more detail. For example, a power management integrated circuit 10 according to the embodiment includes a controller 100, a plurality of DC/DC converters $\mathbf{110}_1$, $\mathbf{110}_2$, and $\mathbf{110}_3$, and a plurality of LDO regulators $\mathbf{120}_1$, $\mathbf{120}_2$, and $\mathbf{120}_3$. Switching elements $\mathbf{140}_1$, $\mathbf{140}_2$, and $\mathbf{140}_3$ are provided at a front (input) ends of the LDO regulators to select different power.

At least one current detector may be provided at the rear end of at least one of the DC/DC converters. For example, a first current detector $\mathbf{130}_1$, and a second current detector $\mathbf{130}_2$ may be provided at the rear ends of the first DC/DC converter $\mathbf{110}_1$ and the second DC/DC converter $\mathbf{110}_2$, respectively, and the first to third switching elements $\mathbf{140}_1$ to $\mathbf{140}_3$ may be provided at the front ends of the first to third LDO regulators $\mathbf{120}_1$ to $\mathbf{120}_3$, respectively.

The first to third switching elements $\mathbf{140}_1$ to $\mathbf{140}_3$ are supplied with the main power of 3.7V/1500 mA, the DCO1 power of 2.5V/450 mA, and the DCO2 power of 3.3V/1000 mA, respectively. The power supplied to the first to third switching elements $\mathbf{140}_1$ to $\mathbf{140}_3$ has higher voltage than the output voltages of the first to third LDO regulators $\mathbf{120}_1$ to $\mathbf{120}_3$.

For example, the DCO3 power of 1.3V/500 mA converted by the third DC/DC converter $\mathbf{110}_3$ is not appropriate as the input power of the first LDO regulator $\mathbf{120}_1$ that outputs the LDO1 power of 1.8V/100 mA, or as the input power of the second LDO regulator $\mathbf{120}_2$ that outputs the LDO2 power of 1.5V/200 mA. Thus, the DCO3 power is not used as the input power of the first to third switching elements $\mathbf{140}_1$ to $\mathbf{140}_3$.

Figure 4:
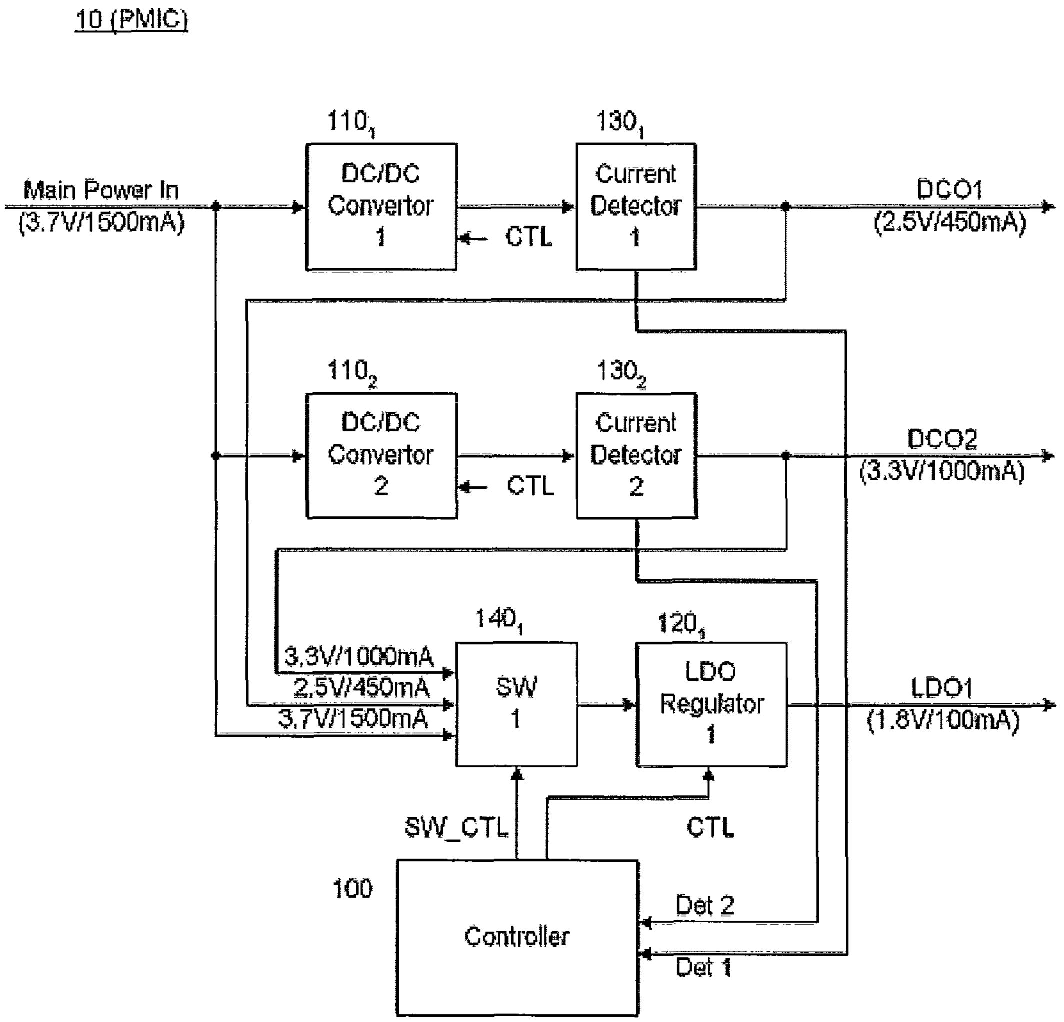

Meanwhile, in the case of selecting, for example, the DCO1 power of 2.5V/450 mA among the plurality of power sources input to the first switching element, the controller 100 verifies the current value detected by the first current detector $\mathbf{130}_1$ connected to the DCO1 power source and supplies the selected DCO1 power of 2.5V/450 mA to the first LDO regulator $\mathbf{120}_1$ as the input power, as shown in FIG. 4.

When the current value detected by the first current detector $\mathbf{130}_1$ exceeds a reference current value (e.g. 400 mA) set to be lower than, for example, the DCO1 power of 2.5V/450 mA by a constant current value, the controller 100 determines that the number of power-consuming loads connected at the rear end of the first DC/DC converter 1101 and at the rear end of the first LDO regulator 1201 has increased.

When the current value detected by the first current detector $\mathbf{130}_1$ exceeds the reference current value set to be lower than, for example, the DCO1 power of 2.5V/450 mA by the constant current value, the controller 100 selects the DCO2 power of 3.3V/1000 mA among the plurality of power sources input to the first switching element $\mathbf{140}_1$ and supplies it to the first LDO regulator $\mathbf{120}_1$ as the input power.

Then, the controller 100 verifies the current value detected by the second current detector $\mathbf{130}_2$ connected to the DCO2 power source. When the detected current value exceeds a reference current value (e.g. 900 mA) set to be lower than, for example, the DCO2 power of 3.3V/1000 mA by a constant current value, the controller 100 determines that the number of power-consuming loads connected at the rear end of the second DC/DC converter $\mathbf{110}_2$ and at the rear end of the first LDO regulator $\mathbf{120}_1$ has increased.

When the current value detected by the second current detector $\mathbf{130}_2$ exceeds the reference current value set to be lower than, for example, the DCO2 power of 3.3V/1000 mA by the constant current value, the controller 100 performs a switching control operation of selecting the main power of 3.7V/1500 mA among the plurality of power input to the first switching element $\mathbf{140}_1$ and supplying it to the first LDO regulator $\mathbf{120}_1$ as the input power.

That is, the controller 100 verifies the current values detected by the first current detector $\mathbf{130}_1$ and the second current detector $\mathbf{130}_2$, preferentially selects power having as low a voltage as possible, and supplies it to the LDO regulator as the input power. This enables power loss caused by the LDO regulator to be minimized.

If the current values detected by the first and second current detectors $\mathbf{130}_1$ and $\mathbf{130}_2$ are both lower than predetermined reference current values (e.g. 400 mA and 900 mA, respectively) while the main power of 3.7V/1500 mA is supplied to the first LDO regulator $\mathbf{120}_1$ as the input power, the controller

100 selects the DCO1 power of 2.5V/450 mA having the lowest voltage value and supplies it to the first LDO regulator $\mathbf{120}_1$ as the input power.

Figure 5:
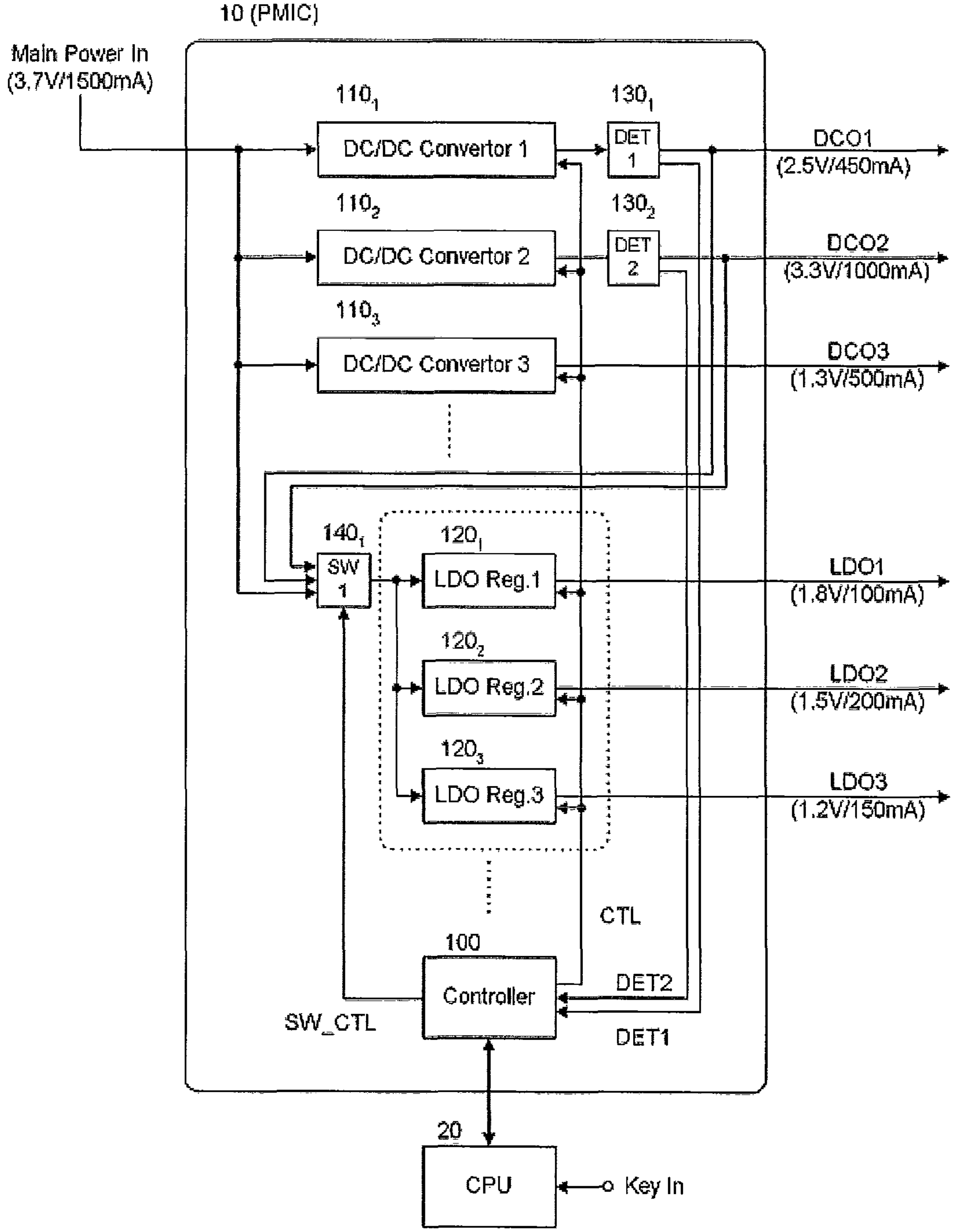

Meanwhile, the switching element may be commonly connected to the front ends of the plurality of LDO regulators. For example, the first switching element $\mathbf{140}_1$ may be commonly connected to the front ends of the LDO regulators $\mathbf{120}_1$ to $\mathbf{120}_3$ as shown in FIG. 5.

Figure 6:
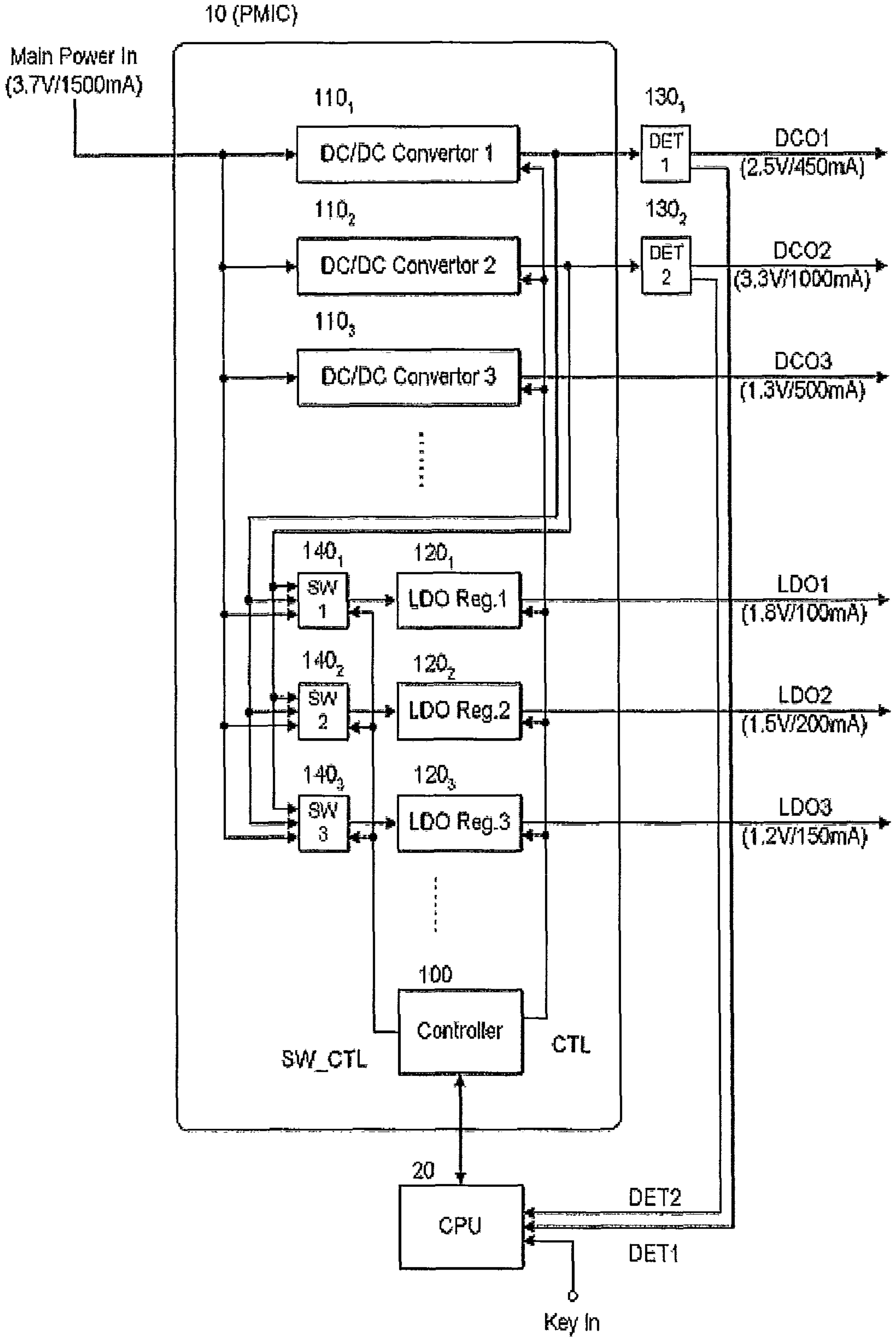

Further, the first current detector $\mathbf{130}_1$ and the second current detector $\mathbf{130}_2$ may be provided outside the PMIC 10 as shown in FIG. 6. In this case, the current values detected by the current detectors may be input to the controller 100 via the CPU 20.

Figure 7:
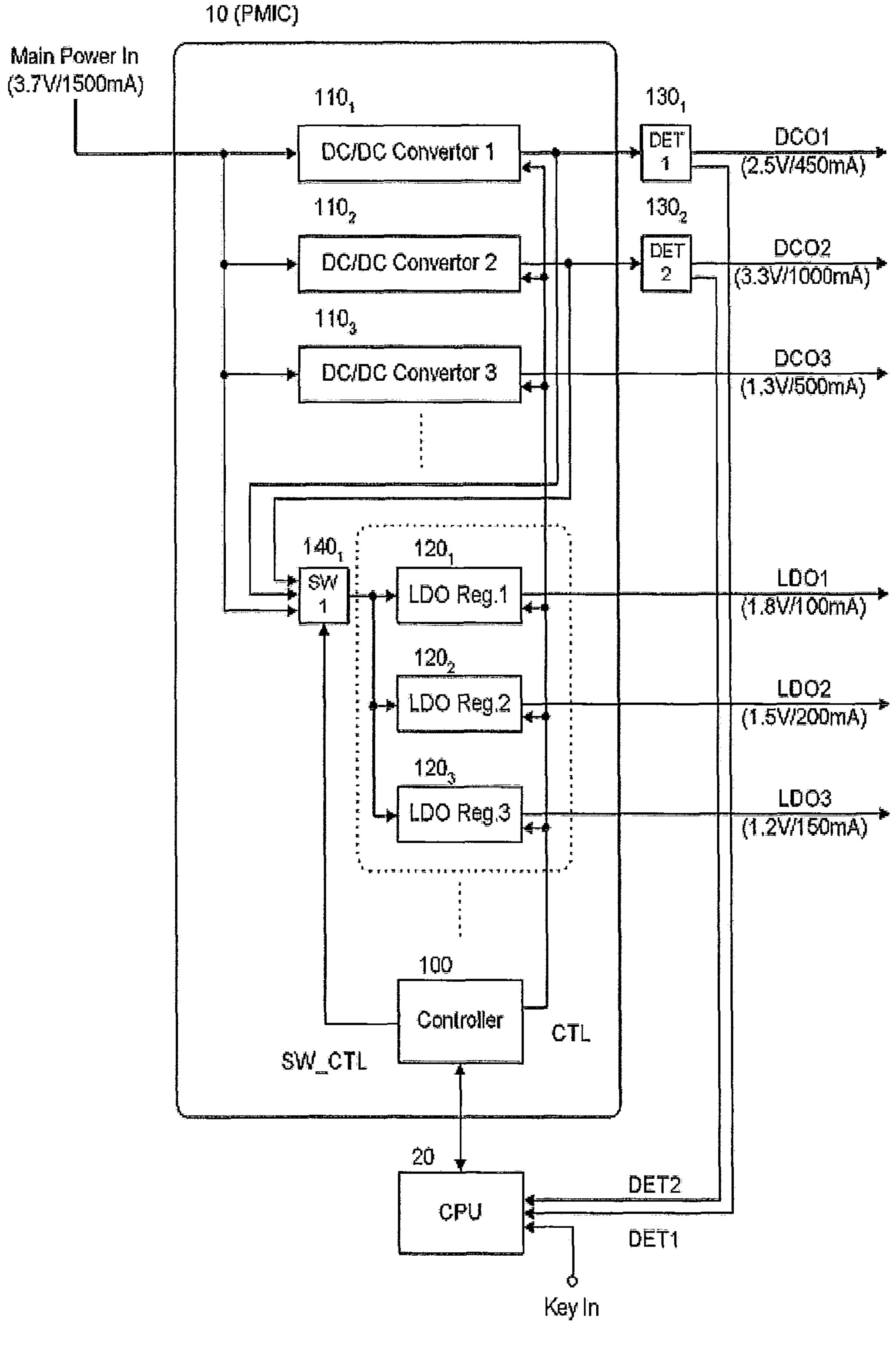

Besides the current detectors being provided outside the power management integrated circuit, the switching element may be commonly connected to the front ends of the plurality of LDO regulators as shown in FIG. 7.

The CPU 20 executes various application programs in response to a user's key entries. For example, upon receipt of a request to operate a camera module connected to the rear end of the first DC/DC converter $\mathbf{110}_1$ the CPU 20 generates a control signal and transmits it to the controller 100 so that the controller 100 may execute a corresponding application program.

Upon receipt of the control signal, the controller 100 predicts that the number of loads provided at the rear end of the first DC/DC converter $\mathbf{110}_1$ will increase, and controls the first switching element $\mathbf{140}_1$ to change the input power supplied to the first LDO regulator $\mathbf{120}_1$ to power having higher voltage and current values than the present input power in advance.

Figure 8:
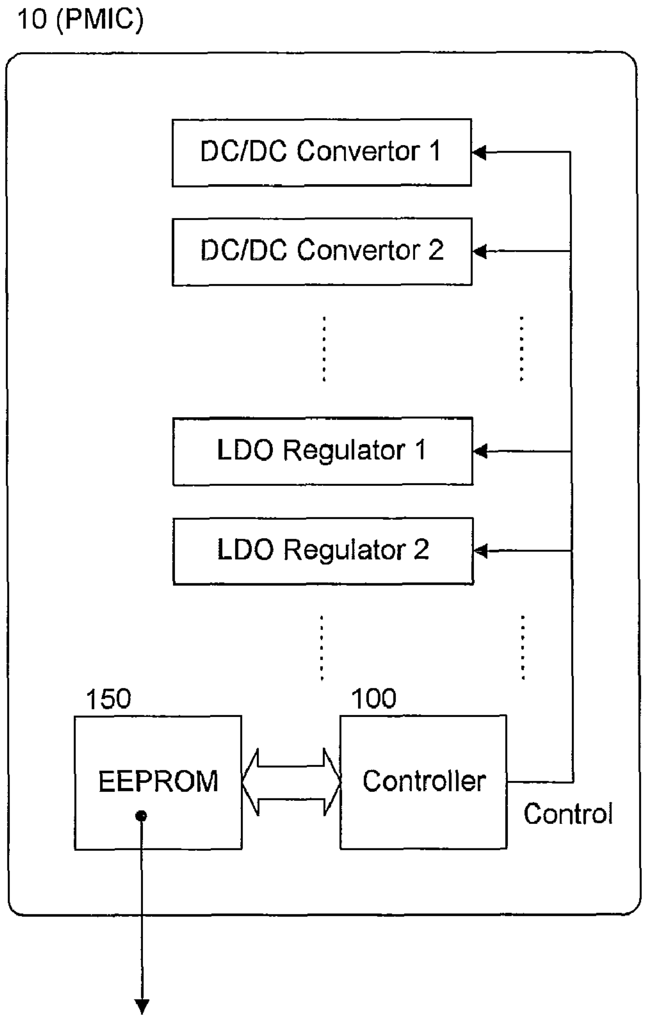

Meanwhile, as shown in FIG. 8, the PMIC 10 may include a non-volatile memory such as EEPROM which stores and manages control values of power sequences for controlling the order and timing of ON/OFF switching of the plurality of DC/DC converters and the plurality of LDO regulators.

For example, the non-volatile memory stores and manages as a DCO/LDO control database the control values of power sequences for supplying power suitably for processor unit A and processor unit B manufactured by different makers.

Processor unit A, which is a communication processor, may be manufactured by makers such as EMP, Qualcomm, Infineon, etc., and the DCO/LDO control database stores and manages the control values of power sequences suitably for processor unit A of each maker.

Processor unit B, which is a digital signal processor, may be manufactured by makers such as nVidia, QMAP, Marvell, etc., and the DCO/LDO control database stores and manages the control values of power sequences suitably for processor unit B of each maker.

Accordingly, engineers may design the PMIC more easily by identifying the makers of processor unit A and processor unit B, selecting and designating corresponding DCO/LDO control values from the DCO/LDO control database, and executing power sequences corresponding to the DCO/LDO control values.

Meanwhile, in another embodiment, output voltage from the DC/DC converter included in the PMIC may be supplied to the LDO regulator as the input power without separate switching elements.

Figure 9:
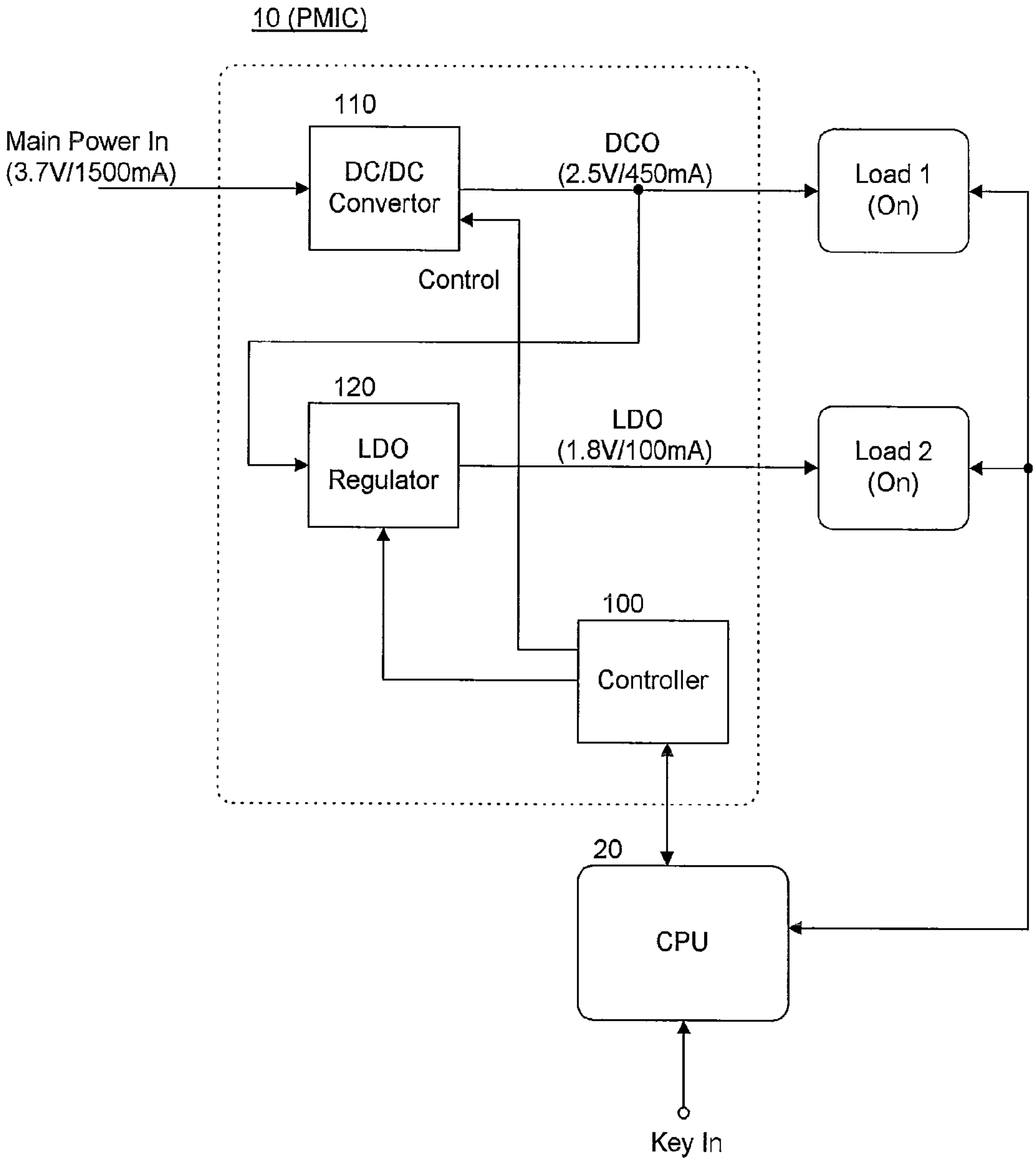
FIGS. 9 and 10 are views schematically illustrating power supplies according to other embodiments.

For example, while the output power DCO of 2.5V/450 mA of the DC/DC converter 110 included in the PMIC is supplied to the LDO regulator 120 as the input power, the controller 100 interfaces with the CPU 20 to determine whether a power-consuming load 1 connected to the DC/DC converter 110 is operating, as shown in FIG. 9.

Meanwhile, the load 1 is a block that performs a specific function, such as an LCD module, a wired LAN module, a wireless LAN module, a Bluetooth module, a camera module, a projector module, etc.

Figure 10:
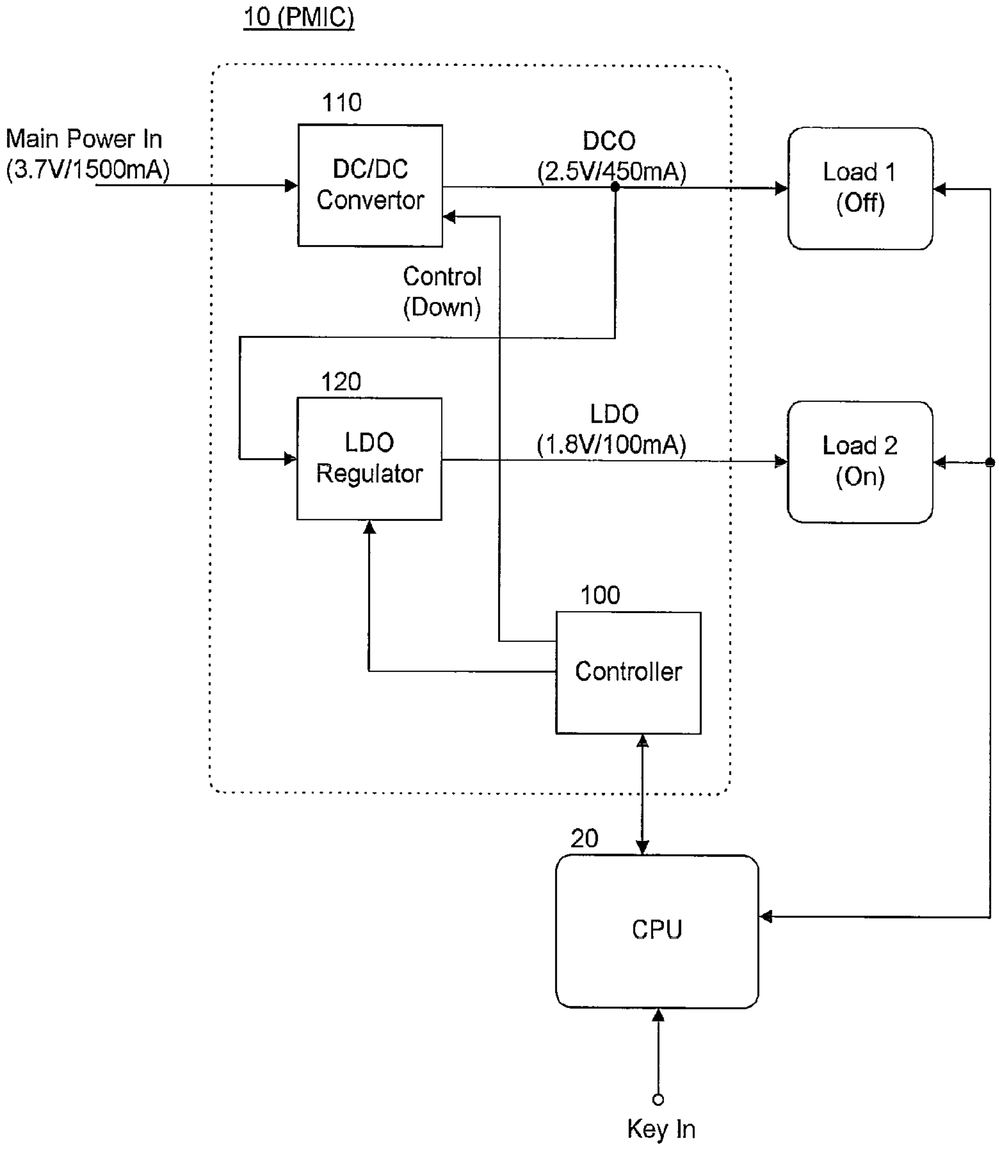

As a result of the determination, if the load 1 connected to the DC/DC converter 110 is not operating, as shown in FIG. 10, the controller 100 variably controls the DC/DC converter 110 so that the output power DCO has voltage and current values lower than 2.5V/450 mA, for example, 2.0V/300 mA.

Accordingly, voltage and current values lower than 2.5V/450 mA, i.e. 2.0V/300 mA, are input to the LDO regulator 120, and this may reduce power loss.

Meanwhile, when the controller 100 interfaces with the CPU 20 and determines that the load 1 connected to the DC/DC converter 110 is operating, the controller 100 variably controls the DC/DC converter 110 to return the output power DCO to the original voltage and current values, 2.5V/450 mA, so that normal operating power is supplied to the load 1 connected to the DC/DC converter 110.

For reference, a high-power load such as a camera module is connected to the rear end of the DC/DC converter 110, a low-power load such as a memory module is connected to the rear end of the LDO regulator 120, and the CPU 20 selectively turns the camera module and the memory module on/off in response to the user's key entries.

Figure 11:
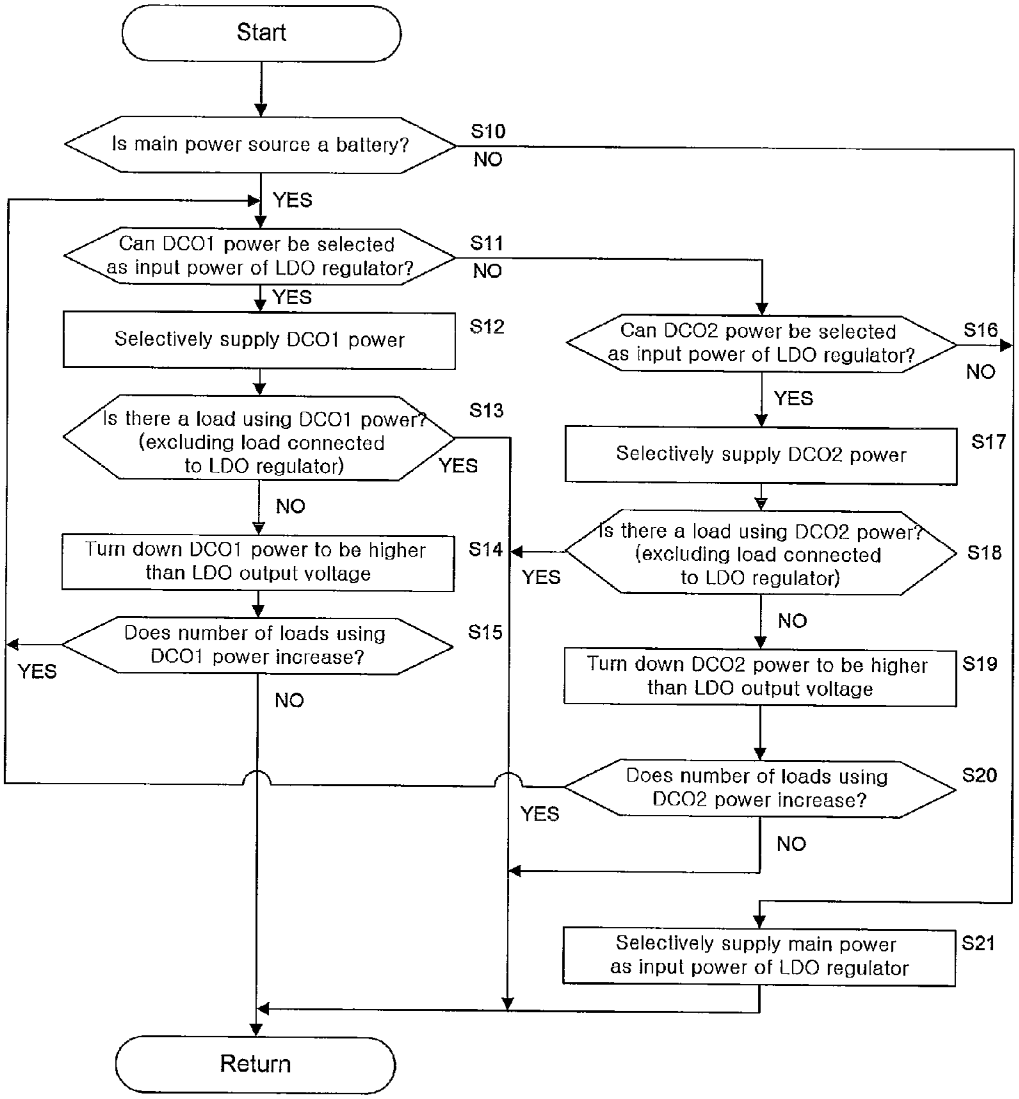
FIG. 11 is a flowchart illustrating a power supplying method according to an embodiment.

FIG. 11 is a flowchart illustrating a power supplying method according to an embodiment. The method will now be described with reference to FIG. 6.

When the main power source is a battery (step S10), the controller 100 included in the PMIC 10 determines whether the DCO1 power may be selected as the input power of the LDO regulator.

When it is determined that the DCO1 power may be selected (step S11), the controller 100 controls the switching element to selectively supply the DCO1 power to the LDO regulator as the input power (step S12), and then identifies the current value detected by the current detector or interfaces with the CPU to determine whether there is any load using the DCO1 power.

When it is determined that there is no load using the DCO1 power (step S13), the controller 100 variably controls the first DC/DC converter that outputs the DCO1 power to turn down the DCO1 power (step S14). However, the turned-down DCO1 power should be adjusted to have a higher voltage than the LDO output voltage.

When the number of loads using the DCO1 power increases (step S15), the controller 100 repeatedly performs the above series of steps.

On the other hand, when the DCO1 power may not be selected as the input power of the LDO regulator while the main power source is a battery, the controller 100 determines whether the DCO2 power may be selected as the input power of the LDO regulator.

When it is determined that the DCO2 power may be selected as the input power (step S16), the controller 100 controls the switching element to selectively supply the DCO2 power to the LDO regulator as the input power (step S17), and identifies the current value detected by the current detector, or interfaces with the CPU to determine whether there is any load using the DCO2 power.

When it is determined that there is no load using the DCO2 power (step S18), the controller 100 variably controls the second DC/DC converter that outputs the DCO2 power to turn down the DCO2 power (step S19). However, the turned-down DCO2 power should be adjusted to have a higher voltage than the LDO output voltage.

When the number of loads using the DCO2 power increases (step S20), the controller 100 repeatedly performs the above series of steps. If the main power source is not the battery but an external power source supplying unlimited power, the controller 100 continues to supply power to the LDO regulator as the input power by using the external power source (step S21).

The foregoing embodiments and advantages are merely exemplary and are not to be construed as limiting the present document. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, no such limitation is intended to be interpreted under 35 USC 112(6).

What is claimed is:

1. An apparatus for supplying power to an electronic device, the apparatus comprising:

a main power input;

a plurality of DC/DC converters having an input connected to the main power input and configured to output power to a plurality of first power-consuming loads;

a plurality of low dropout (LDO) regulators having an input connected to an output of the plurality of DC/DC converters, the plurality of LDO regulators configured to output converted power to a plurality of second power-consuming loads; and a controller operatively connected to the plurality of DC/DC converters, and the plurality of LDO regulators, the controller configured to variably control a supply of power from one of the plurality of DC/DC converters to one of the plurality of LDO regulators as an LDO regulator input power based on whether a corresponding one of the plurality of first power-consuming loads is off or will be turned on.

2. The apparatus for supplying power to an electronic device of claim 1, wherein:

the controller is configured to determine whether the corresponding one of the plurality of first power-consuming loads is turned off, and if the corresponding one of the plurality of first power-consuming loads is determined to be turned off, the controller is configured to variably control the one of the plurality of DC/DC converters so that the LDO regulator input power has a suitably low voltage as the LDO regulator input power.

3. The apparatus for supplying power to an electronic device of claim 1, wherein:

the controller is configured to predict whether the corresponding one of the plurality of first power-consuming loads will be turned on, and if the corresponding one of the plurality of first power-consuming loads is predicted to be turned on, the controller variably controls the one of the plurality of DC/DC converters so that appropriate power is supplied to the corresponding one of the plurality of first power-consuming loads.

4. The apparatus for supplying power to an electronic device of claim 1, further comprising:

one or more switching elements connecting the plurality of LDO regulators to the main power unit and the output of the plurality of DC/DC converters, the one or more switching elements configured to select the main power input or the one of the plurality of DC/DC converters as an input to the one of the plurality of LDO regulators based on a characteristic of one of the plurality of first power-consuming loads or a characteristic of one of the plurality of second power-consuming loads.

5. The apparatus for supplying power to an electronic device of claim 4, further comprising:

a current detector provided at an output end of the one of the plurality of DC/DC converters, wherein the controller is configured to control an operation of the one or more switching elements so that a current value detected by the current detector does not exceed a predetermined reference current value and the LDO regulator input power is as low a voltage as possible that is suitable for the one of the plurality of LDO regulators.

6. The apparatus for supplying power to an electronic device of claim 4, wherein:

the controller is configured to predict whether a number of the plurality of first power-consuming loads or a number of the plurality of second power-consuming loads will increase, and control the one or more switching elements to select a power having as low a voltage as possible that is suitable for the plurality of LDO regulators.

7. The apparatus for supplying power to an electronic device of claim 6, wherein:

the controller is configured to control the one or more switching elements in anticipation of the increase in the number of the plurality of first power-consuming loads or the number of the plurality of second power-consuming loads.

8. The apparatus for supplying power to an electronic device of claim 4, further comprising:

a non-volatile memory configured to store control values of power sequences for the plurality of DC/DC converters and the plurality of LDO regulators separately.

9. The apparatus for supplying power to an electronic device of claim 8, wherein:

the controller is configured to control an ON/OFF order and a timing of the plurality of DC/DC converters and the plurality of LDO regulators for supplying power according to the control value of any one power sequence stored in the non-volatile memory.

10. A method for supplying power by an apparatus to an electronic device having a plurality of DC/DC converters having an input connected to a main power input and configured to output power to a plurality of first power-consuming loads, and a plurality of low dropout (LDO) regulators having an input connected to an output of the plurality of DC/DC converters, the plurality of LDO regulators configured to output converted power to a plurality of second power-consuming loads, the method comprising:

variably controlling, by the apparatus, a supply of output power from one of the plurality of DC/DC converters to one of the plurality of LDO regulators as an LDO regulator input power based on whether a corresponding one of the plurality of first power-consuming loads is off or will be turned on.

11. The method of claim 10, wherein the electronic device includes one or more switching elements connecting the plurality of LDO regulators to the main power unit and the output of the plurality of DC/DC converters, the method further comprising:

selecting, via the one or more switching elements, the main power input or the one of the plurality of DC/DC converters as an input to the one of the plurality of LDO regulators based on a characteristic of one of the plurality of first power-consuming loads or a characteristic of one of the plurality of second power-consuming loads.

12. The method of claim 11, wherein the electronic device includes a current detector provided at an output end of the one of the plurality of DC/DC converters, the method further comprising:

controlling, by the apparatus, an operation of the one or more switching elements so that a current value detected by the current detector does not exceed a predetermined reference current value and the LDO regulator input power is as low a voltage as possible that is suitable for the one of the plurality of LDO regulators.

13. The method of claim 11, further comprising:

predicting, by the apparatus, whether a number of the plurality of first power-consuming loads or a number of the plurality of second power-consuming loads will increase, and controlling the one or more switching elements to select a power having as low a voltage as possible that is suitable for the plurality of LDO regulators.

14. The method of claim 11, further comprising:

controlling, by the apparatus, the one or more switching elements in anticipation of the increase in the number of the plurality of first power-consuming loads or the number of the plurality of second power-consuming loads.

15. The method of claim 10, further comprising:

determining, by the apparatus, whether the corresponding one of the plurality of first power-consuming loads is turned off, and if the corresponding one of the plurality of first power-consuming loads is determined to be turned off, variably controlling the one of the plurality of DC/DC converters so that the LDO regulator input power has a suitably low voltage.

16. The method of claim 10, further comprising predicting, by the apparatus, whether the corresponding one of the plurality of first power-consuming loads will be turned on, and if the corresponding one of the plurality of first power-consuming loads is predicted to be turned on, variably controlling the one of the plurality of DC/DC converters so that appropriate power is supplied to the corresponding one of the plurality of first power-consuming loads.

17. The method of claim 10, further comprising:

if power is supplied to the one of the plurality of DC/DC converters not from a battery but from an external power source, fixing the one of the plurality of DC/DC converters to have a predetermined initial power value.

* * * * *